United States Patent [19]
Hansen

[11] Patent Number: 5,445,192
[45] Date of Patent: Aug. 29, 1995

[54] METHOD FOR DELIVERY OF SALT

[75] Inventor: Roger L. Hansen, Wood Lake, Minn.

[73] Assignee: Equity Elevator and Trading Company, Wood Lakes, Minn.

[21] Appl. No.: 170,387

[22] Filed: Dec. 20, 1993

[51] Int. Cl.⁶ .............................................. B65B 1/00
[52] U.S. Cl. ......................................... 141/2; 141/21; 141/67; 141/95; 141/231; 137/899; 137/360
[58] Field of Search ....................................... 141/1-3, 141/18, 21, 67, 95, 231; 222/608, 610, 626-628; 137/351, 357, 358, 360, 899, 899.4

[56] References Cited

U.S. PATENT DOCUMENTS

| | | | |
|---|---|---|---|
| 3,034,543 | 5/1962 | Du Bois | 141/21 |
| 3,570,053 | 3/1971 | De Boliac | 222/627 X |
| 3,880,212 | 4/1975 | Harris | 141/231 |
| 4,082,124 | 4/1978 | Jenkins | 141/231 X |
| 4,114,661 | 9/1978 | Harris | 141/231 |
| 4,641,693 | 2/1987 | Rakucewicz | 141/231 X |
| 4,987,409 | 1/1991 | Jackson | 340/623 |
| 5,029,602 | 7/1991 | McKinney et al. | 137/899 X |
| 5,240,043 | 8/1993 | Campbell | 137/899 |

Primary Examiner—J. Casimer Jacyna
Attorney, Agent, or Firm—Merchant, Gould, Smith, Edell, Welter & Schmidt

[57] ABSTRACT

An apparatus for and a method of delivering water softener salt in bulk to residential water softeners is disclosed. The apparatus includes a bulk salt hopper mounted to a transportable frame that can be lifted by forklift and carried in the bed of a conventional pick up truck. The hopper includes an inlet for receiving salt pellets in bulk form and a discharge outlet which can be opened and closed by a gate valve. A motor driven air pump mounted with the hopper maintains the hopper at a predetermined relatively low pressure. A delivery hose is connected to the hopper outlet, and with the gate valve opened and the air pump running, salt pellets flow through the delivery hose. The delivery hose is sealably connectable through an externally accessible coupling at the serviced residence, and an internal delivery pipe leads to the water softener salt bin. Sensors are included for remotely determining the level of salt within the water softener bin, enabling the operator to stop salt delivery when the bin is full.

5 Claims, 6 Drawing Sheets

METHOD FOR DELIVERY OF SALT

BACKGROUND OF THE INVENTION

The invention broadly relates to dispensing apparatus and is specifically directed to apparatus for and a method of delivering water softener salt in bulk to residential water softeners.

Water softeners are commonly used in residences to "soften" hard water; i.e., water containing minerals such as calcium, magnesium and iron. The water softening process causes ions of such minerals to be replaced by sodium ions on a continuous basis as hard water is supplied to the water softener from an external source. Because the process is continuous, the salt, which is kept in a bin adjacent the water softener, must be replenished periodically.

Salt used in a water softening process typically takes the form of rock salt or salt pellets, which is typically sold in bags of various sizes. Based on the amount of salt used in a water softening process, even the smallest salt bags tend to be somewhat large, bulky and heavy.

If salt replenishment is done by the home owner, it is necessary to purchase bags of salt from a grocery store or other source, which must be loaded into the user's car, subsequently unloaded and carried to the water softener. Each bag must then be opened, lifted and emptied into the salt bin. In addition to the fact that the salt bags are heavy, emptying them generally produces salt dust, which results from abrasive action between the salt pellets during transport. This dust settles on the surrounding equipment and floor, leaving a dusty environment that is difficult to clean.

If the home owner uses a water softening service, the servicing personnel must load the delivery truck with numerous bags of salt sufficient for a particular route, and these bags must be unloaded, carried into the residence and emptied in the same manner. The fact that the servicing personnel must enter the residence means that the home owner must either be at home at the time of delivery, or must provide the servicing personnel with some means for entering the home. Many home owners are hesitant to do this, particularly where there is some degree of turnover in servicing personnel; i.e., the home owner is hesitant to give access to the home to unknown individuals.

The inventive apparatus and method have been devised to overcome these problems, and to provide a system of salt delivery that does not require the lifting of salt bags or entry into the home owner's residence. Further, the system utilizes bulk rather than bagged salt, which affords cost savings as well.

Specifically, the apparatus comprises a bulk salt hopper mounted to a transportable frame that can be lifted by forklift and carried in the bed of a conventional pick-up truck or other transport vehicle. The hopper has a sealable inlet top opening for receiving salt pellets in bulk and a discharge outlet at the bottom which can be opened and closed by a gate valve. A small internal combustion engine drives an air pump, both of which are mounted on the transportable frame. The air pump outlet is communicated to the top of the sealable hopper and generates a relatively low pressure; e.g., 3 psi. A delivery hose is connected to the hopper outlet, and when the gate valve is opened with the engine and air pump running, salt pellets flow through the delivery hose.

Within the residence, a salt delivery pipe is plumbed between the water softener salt bin and an external coupling to which the delivery hose may be sealably connected. The internal delivery pipe extends through a filter bag into the salt bin, with the filter bag also overlying the top of the bin to prevent the escape of salt dust.

A pair of low voltage electrical leads are connected to a level indicating switch in the salt bin and lead from the switch along the salt delivery pipe within the residence to the external coupling. A pair of similar leads are connected in series to a low voltage source at the apparatus and an indicator light on an operating panel, and run along the salt delivery hose. At the time of delivery, the two sets of leads are connected at the external coupling. When salt within the water softening bin rises to a predetermined level, the level indicating switch closes to light the indicator light. The operator then closes the gate valve and disconnects the delivery hose from the external coupling and returns it to the bed of the pick-up truck.

Utilizing the salt delivery apparatus, salt may be delivered to a series of residences quickly and easily, eliminating the need for unloading and carrying heavy salt bags into the residence and emptying them into the water softener salt bin. Of particular importance is the fact that the operator need not enter the residence, which benefits the operator by saving time and effort, and which benefits the home owner from the standpoint of security. Both the operator and home owner are benefitted by the fact that the home owner does not have to be present during delivery.

DESCRIPTION OF THE PREFERRED EMBODIMENT

Figure 1:
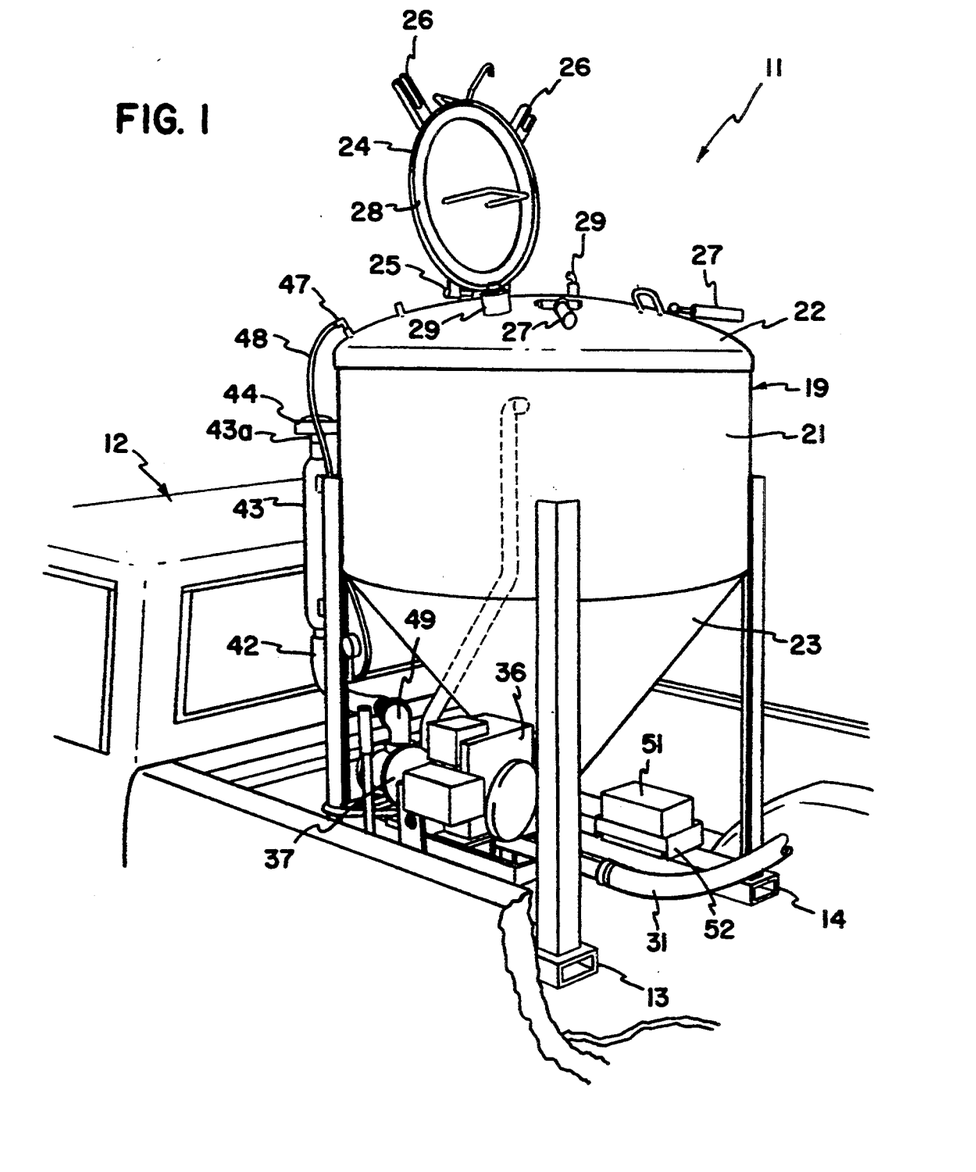
FIG. 1 is a fragmentary perspective view of a salt delivering apparatus disposed in the bed of a pickup truck.

With initial reference to FIG. 1, a salt delivering apparatus bearing the general reference numeral 11 is disposed in the bed of a conventional pickup truck 12. Apparatus 11 comprises a pair of horizontally disposed, parallel frame members 13, 14 that form the base of apparatus 11. Frame members 13, 14 each comprises an elongated steel tube of rectangular cross section. The spacing of the frame members 13, 14 and the internal size of these members permits the entry of the prongs of a conventional forklift, enabling the apparatus 11 to be lifted into and removed from the bed of pickup truck 12.

Figure 2:
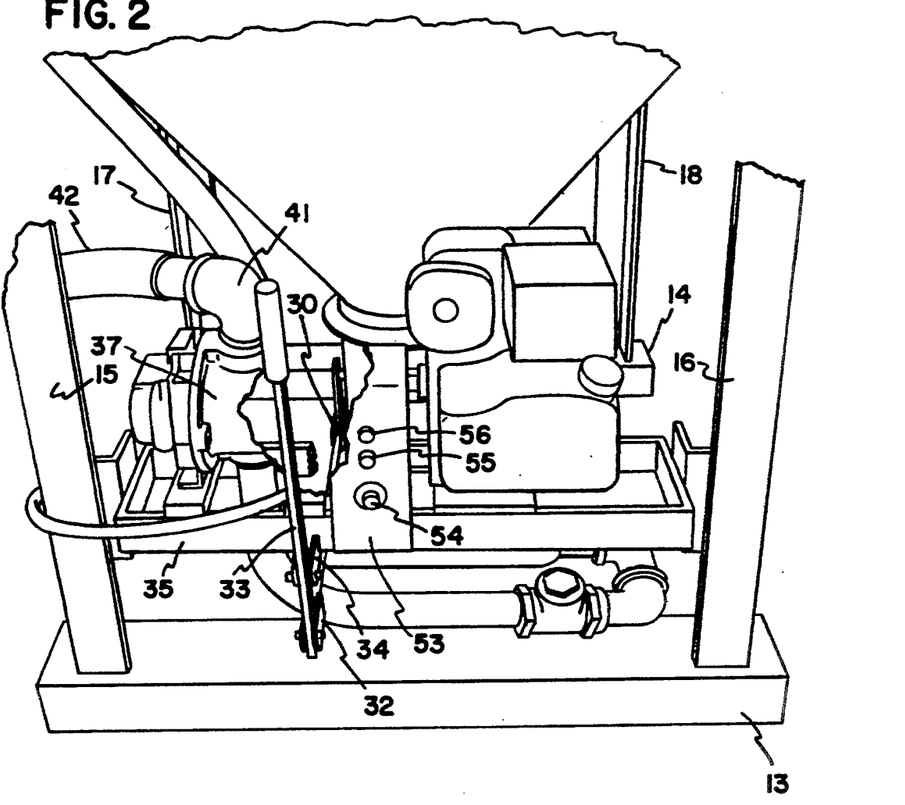
FIG. 2 is an enlarged fragmentary perspective view of the salt delivering apparatus as viewed from one side thereof.
Figure 2A:
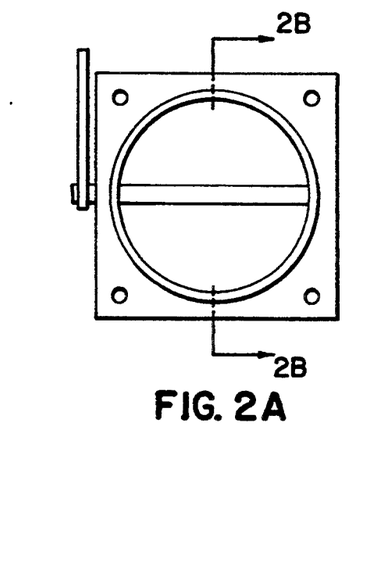
Figure 2B:
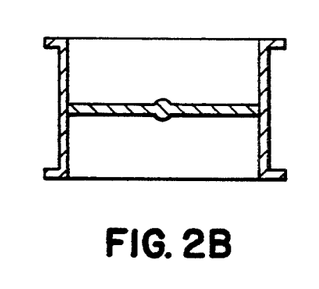
Figure 2C:
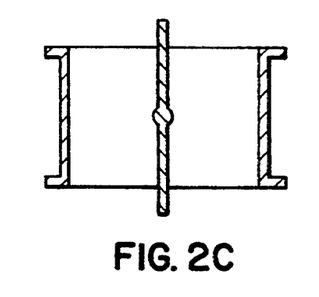

With additional reference to FIG. 2, two vertically disposed frame members 15, 16 are secured to (as by welding) and project vertically upward from the frame member 13 at the respective ends thereof, and vertical frame members 17, 18 are secured to and project upward from horizontal frame member 14 in a like manner. All four of the vertical frame members 15–18 are preferably formed from angle iron with the inner faces thereof facing inward to receive and support a hopper 19 that receives and stores water softening salt.

In the preferred embodiment, hopper 19 is sealed, comprising a cylindrical main portion 21, a dome-shaped top 22 and a frustroconical lower portion 23. The domed top 22 has a centrally disposed circular opening (not shown) which is sealed by a circular cover 24 that is pivotally mounted to the top 22 by a hinge 25. Sealed top 24 includes a pair of laterally projecting bifurcated ears 26 that interlockably engage a pair of handle clamps 27 when the cover is placed in sealing position. The handle clamps 27 interlockably engage the bifurcated ears 26 and operate in an over-center manner when lowered to clamp the cover 24 in sealed relation to top 22. A resilient annular seal 28 is disposed on along the inner peripheral edge of cover 24 to effect an air tight seal with top 22.

A pressure relief valve 29 is carried by the dome-shaped top 22.

With reference to FIG. 1, the extreme lower end of the frustroconical portion 23 of hopper 19 includes an outlet fitting having a gate valve 30, leading to a salt delivery hose 31. The gate valve 30 is actuated by a horizontal linkage member 32 (FIG. 2) which is moved by an upright handle member 33. A fixed linkage member 34 is secured to a cross frame member 35. Handle member 33 is pivotally connected to both of the linkage members 32, 34, enabling the user to open the gate valve 30 by pushing handle 33, and to close the gate valve by pulling handle 33.

With continued reference to FIGS. 1 and 2, a gasoline engine 36 is mounted to the cross frame member 35. In the preferred embodiment, engine 36 is a relatively small four cycle internal combustion engine, and in the preferred embodiment has a five horse power output.

Engine 36 drives a conventional air pump 37, which is best shown in FIG. 2. The driving connection between engine 36 and air pump 37 is conventional and not shown. It consists of a rubber drive wheel connected to engine 36 and a rubber driven wheel connected to air pump 37. The peripheries of the drive and driven wheels frictionally engage to accomplish the driving function. The relative diameters of the drive and driven wheels determine the operating speed of air pump 37. In the preferred embodiment, air pump 37 is operated at a speed to produce a relatively low pressure output. Air pump 37 includes a pressure regulating valve (not shown) to control its output, which in the preferred embodiment is about 3 psi.

With continued reference to FIGS. 1 and 2, an inlet fitting 41 is secured to the inlet of air pump 37, which is on its top surface. As best shown in FIG. 1, a flexible hose 42 interconnects inlet fitting 41 and a vertically disposed air intake 43. A rain cap 44 prevents rain from entering air intake 43.

As shown in FIG. 1, the air inlet of air intake 43, which bears reference numeral 43a (the portion covered by rain cap 44), has a smaller inside diameter than that of the main body of air intake 43. As such, when air is drawn through the inlet 43a, it expands into the main body portion, reducing pressure and causing moisture in the air to condense before entering the air pump. The purpose of this moisture condensing function is to maintain the salt in hopper 19 as dry as possible, thus preventing the salt pellets from sticking together and insuring a smooth flow during the discharge operation.

With continued reference to FIGS. 1 and 2, an air outlet pipe or hose 45 leads from an outlet fitting of air pump 37 (not shown) and it connects to an elbow fitting 46 secured to the side of hopper 19. As indicated above, the outlet pressure of air pump 37 is preferably on the order of 3 psi, and this pressure is communicated through hose 45 and fitting 46 to the inside of sealed hopper 19, exerting pressure in this amount on the salt pellets previously filled. Further, because of the relatively low speed of air pump 37, it tends to produce a pulsating effect which enhances the discharge and delivery of salt pellets as discussed in further detail below.

With reference to FIG. 1, a small pressure fitting 47 is mounted on the dome shaped top 22 of hopper 19. A flexible pressure tube 48 leads from fitting 47 to a pressure gauge 49, thus enabling the operator to monitor pressure within hopper 19. As indicated above, a pressure relief valve 29 is also mounted on dome shaped top 22, and if pressure within hopper 19 reaches a limit of about 25 psi, pressure relief valve 29 will open. As a practical matter, if pressure within hopper 19 exceeds 3 psi by any significant amount, the back pressure that is communicated through hose 45 to air pump 37 tends to backload the pump and hence engine 36, resulting in stoppage of engine 36.

With reference to FIG. 1, a battery 51 is carried by a battery box 52 mounted to horizontal frame member 14. Battery 51 is used to start engine 36 and is maintained in a charged state by the engine generator (not shown). Battery 51 also provides voltage to an indicator circuit as discussed in further detail below.

With reference to FIG. 2, apparatus 11 includes a small control panel 53 having an on-off switch 54 for engine 36, a push button start switch 55 for engine 36 and an indicator light 56 the purpose of which is described in further detail below.

Salt delivery hose 31 is of sufficient length to reach from the salt delivery apparatus 11 to the external residence coupling as described in further detail below. In the preferred embodiment, salt delivery hose 31 is 150 feet in length.

Figure 4:
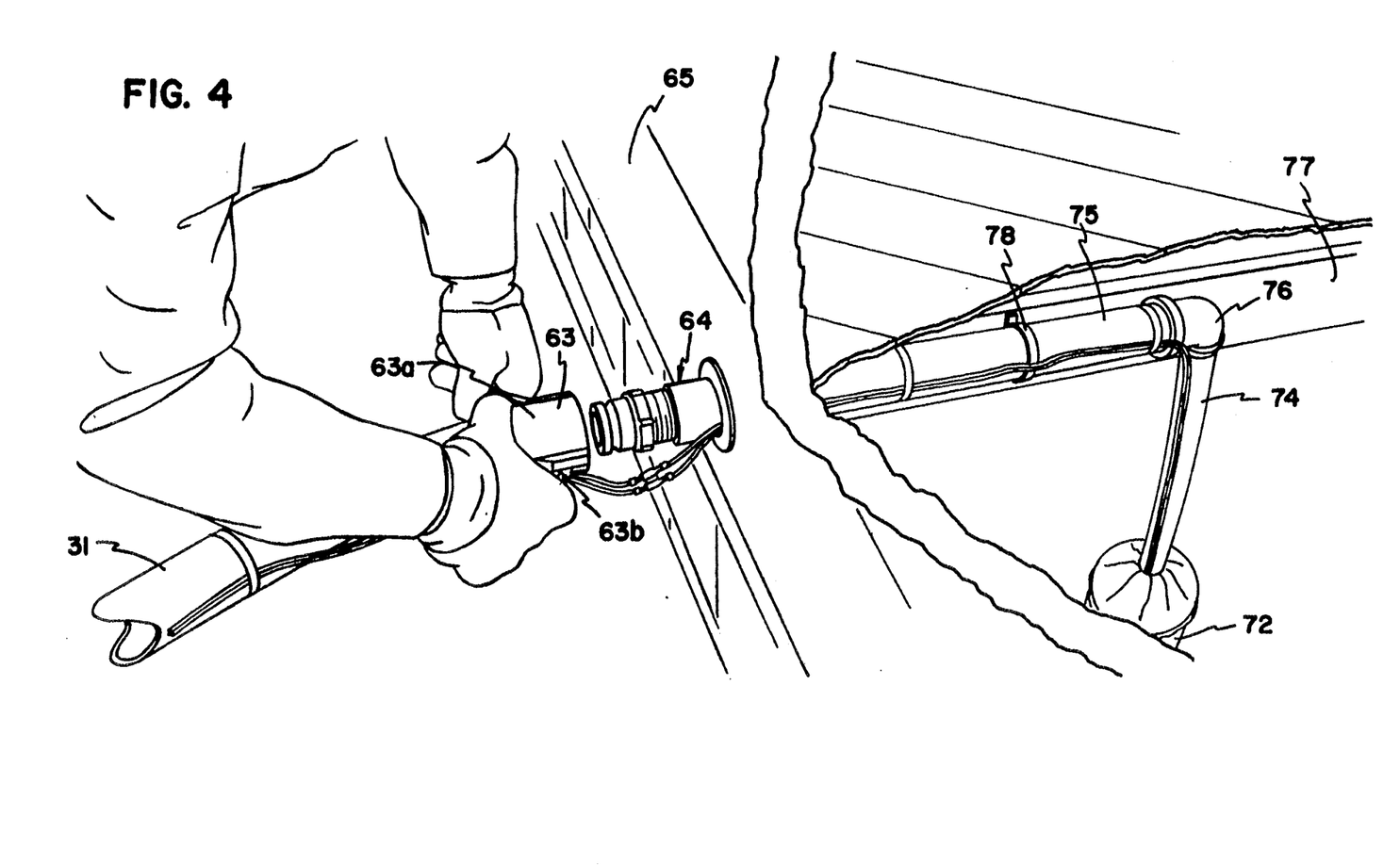
FIG. 4 is an enlarged fragmentary perspective view showing the coupling of FIG. 3 with the infeed pipe and residential salt bin.

As shown in FIG. 4, a pair of low voltage lines or conductors 57, 58 extend along the length of hose 31 and are strapped or otherwise secured to its external surface at spaced points therealong. With momentary reference to the schematic of FIG. 7, low voltage lines 57, 58 terminate in plug type connectors 61, 62, respectively. Line 57 is connected to one terminal of battery 31. Line 58 is connected in series with indicator light 56 on panel 53 and the opposite terminal of battery 31.

Returning to FIG. 4, the extreme end of hose 31 terminates in a mechanical coupling 63 that will be discussed in further detail below.

Figure 3:
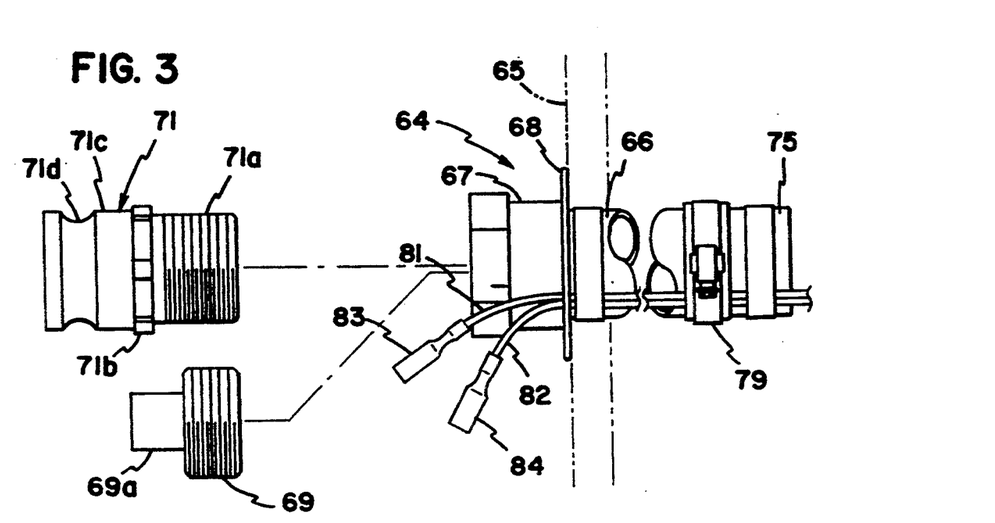
FIG. 3 is a side elevation of a portions coupling between the salt delivering apparatus and a residential infeed pipe.

With reference to FIG. 3, hose coupling 63 is sealably interconnectible with an external residence coupling bearing the general reference numeral 64. This coupling projects through an external residential wall 65, and includes an internal portion taking the form of a pipe 66 and an external portion including an internally threaded coupling 67 and a flange 68 that lies against the residential wall 65. Normally, an externally threaded plug 69 is screwed into the coupling 67 to close it. A square projecting boss 69a enables the plug 69 to be wrenched in or out. At the time of a salt delivery, plug 69 is removed and replaced with a threaded coupling 71 having an externally threaded portion 71a that screws into the coupling 67 and a toothed ring 71b that is used to grip the coupling 71. Outwardly of toothed ring 71b is a connecting portion 71c having an annular groove 71d.

With combined reference to FIGS. 3 and 4, hose coupling 63 is sized to fit over coupling 71 and includes a sealing O-ring (not shown) that seats into the annular groove 71d. Coupling 63 has a pair of clamping wings 63a, 63b which, when pressed flat against coupling 63, causes the O-ring to compressibly seal against the annular groove 71d. Outward lifting of the wings 63a, 63b releases the internal O-ring and permits the coupling 63 to be removed from coupling 64.

With continued reference to FIG. 4, coupling 64 is located in proximity to a salt bin 72, which in turn is located adjacent a water softener (not shown). Typically, water softeners are located in mechanical areas of basements, and the coupling 64 is therefore shown in a position relatively close to the ground where it is accessible to the salt delivery operator.

Figure 5:
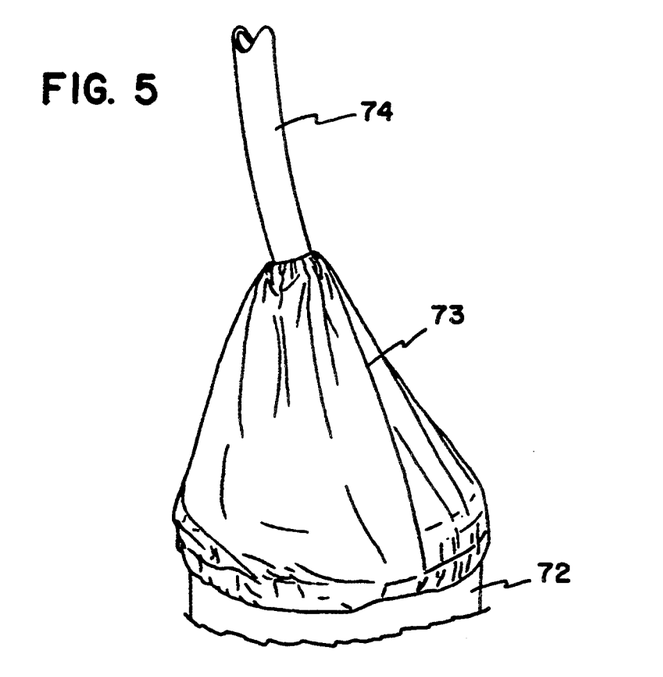
FIG. 5 is a fragmentary view inside elevation of the salt bin, infeed pipe and cover.
Figure 6:
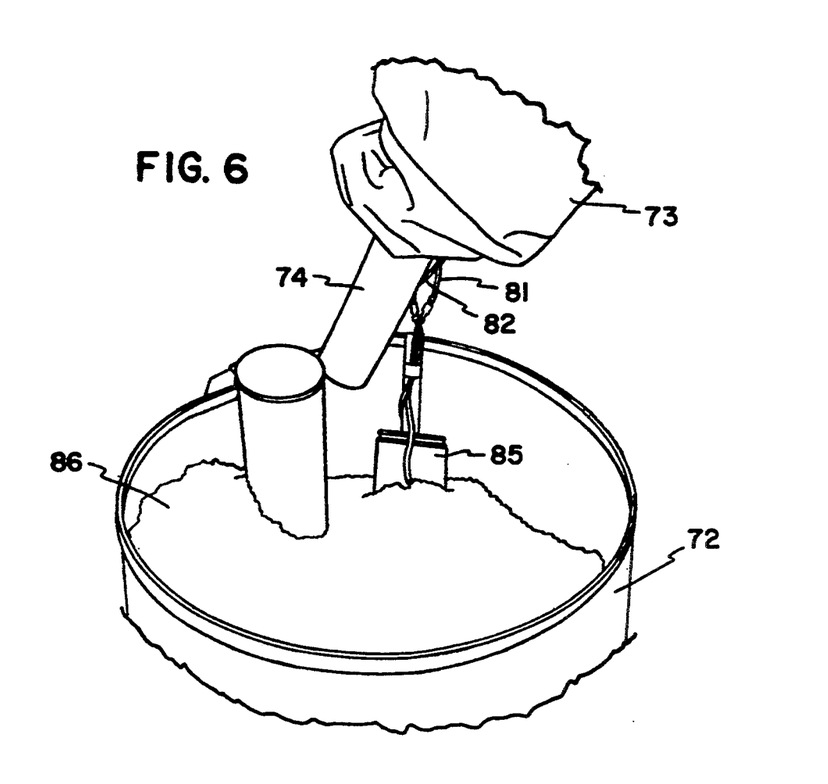
FIG. 6 is an enlarged fragmentary perspective view of the salt bin, infeed pipe and level sensing switch.

With reference to FIGS. 5 and 6, to accommodate the salt delivering apparatus 11, bin 72 is provided with a flexible dust/filter bag 73 having a large open lower end with an elastic periphery that fits over the top opening of bin 72, and a smaller top elastic opening that receives a flexible salt delivery pipe 74.

With reference to FIG. 4, flexible pipe 74 is connected to a rigid pipe 75 through an elbow fitting 76. Rigid pipe 75 is secured to a floor joist 77 or similar structure by a plurality of straps 78. With additional reference to FIG. 3, pipe 75 is coupled to the internal pipe 66 of coupling 64 by a pipe clamp 79.

With reference to FIGS. 3 and 4, a pair of low voltage electrical leads 81, 82 are strapped to pipes 74, 75 and project through wall 65 adjacent coupling 64. At this external point, the leads 81, 82 terminate in socket-type electrical connectors 83, 84 (FIG. 3), that respectively receive the plug type connectors 61, 62 of lines 57, 58 (see also FIGS. 4 and 7).

With additional reference to FIG. 6, the low voltage leads 81, 82 extend into the salt bin 72 and are connected to a level indicating switch 85. The function of switch 85 is to sense the level of salt pellets 86 as bin 72 is filled, and to indicate to the operator that the bin 72 is filled and that the salt discharge may be stopped.

Figure 7:
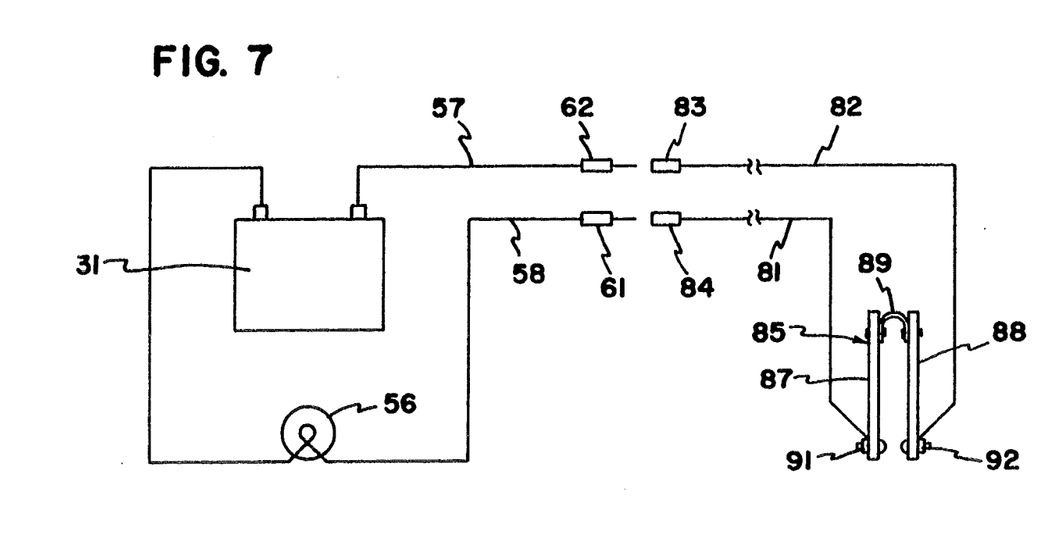
FIG. 7 is a schematic of an electric circuit including the level sensing switch.

With reference to FIG. 7, level indicating switch 85 consists of a pair of nonconductive plates 87, 88 that are normally disposed in substantial alignment. Plates 87, 88 are held in this normal position by a nonconductive resilient strap 89. The strap 89 permits the plates 87, 88 to be moved relative to each other, but in its unflexed state, strap 89 causes the plates 87, 88 to return to the substantially parallel position shown in FIG. 7.

At the plate ends opposite strap 89, electric terminals 91, 92 are respectively connected to the plates 87, 88. Electric leads 81, 82 are respectively connected to the terminals 91, 92.

With reference to FIGS. 4, 6 and 7, with electrical connectors 61, 62 plugged into connectors 83, 84, a compression of the nonconductive plates 87, 88 together by salt as it is filled to the top of bin 72 will cause terminals 91, 92 to contact, which immediately causes indicator light 56 to turn on, indicating to the operator that the salt delivery is completed.

In operation, it will be understood that the portability of salt delivering apparatus 11 enables it to be transported by the pick-up truck 12 or other transportation means from location to location, which can be on a predetermined route of residences to which salt is delivered at periodic intervals.

Prior to delivery, hopper 19 must be filled with a requisite amount of salt pellets. This is accomplished by releasing the two clamping handles 27 and lifting cover 24 to the position shown in FIG. 1. Such filling may be accomplished by an overhead hopper under which the apparatus 11 is driven, or a conveyor or delivery hose that can be brought to the mouth of hopper 19. Handle 33 is pulled to close the gate valve 30 prior to delivery. When the hopper 19 is filled to an appropriate level, cover 24 is lowered and handles 27 operated to sealably clamp cover 24 over the hopper opening. Pick-up truck 12 can then be driven to the various locations to which salt is to be delivered.

Upon arrival at a delivery location, the operator initially starts engine 36 by actuating on-off switch 54 to the on position and pressing start switch 55. This in turn actuates air pump 37, which delivers air under pressure through pipe 45 to the top of hopper 19. Because the system operates at relatively low pressure (e.g., 3 psi), it does not take a significant period of time for pressure in hopper 19 to build to this level.

The operator may touch plug terminals 61, 62 together at this time to test indicator light 56.

The operator then uncoils supply hose 31 from the bed of pick-up truck 12 and brings the discharge end to the external house coupling 64. Plug 69 of house coupling 65 is removed, and the threaded delivery coupling 71 is threadably inserted. Delivery hose coupling 63 is then placed over threaded coupling 71 and wings 63a, 63b are moved to the clamping position. Electrical plug connectors 61, 62 of lines 57, 58 are then plugged into the receptacle connectors 83, 84 of leads 81, 82 to connect the indicator circuit.

The operator then returns to salt delivery apparatus 11, and with engine 36 and pump 37 continuing to run, pushes handle 33 to open the gate valve 30 at the outlet of hopper 19. Gravity causes the salt pellets within hopper 19 to pass through the gate valve into delivery hose 31, and the pressure created by air pump 37 thereafter moves salt pellets through delivery hose 31 to coupling 64, pipes 75 and 74 and the salt bin 72 within the residence. As indicated above, air pump 37 sends pulses of air under pressure, and this enhances the movement of salt pellets through hose 31.

It should be pointed out that filter bag 73 is normally left in the position shown in FIG. 5, and there is generally no need to remove it. Filter bag 73 provides a useful function because water softener salt pellets generally become dusty due to abrasion between the pellets when they are transported. Filter bag 73 serves to contain this dust during salt delivery, while at the same time permitting the escape of air displaced by the salt.

The salt delivery continues with the operator at the site of apparatus 11 in close proximity to handle 33. When a sufficient amount of salt is delivered to salt bin 72, the level rises to the position shown in FIG. 6. As a consequence, nonconductive plates 87, 88 of the level limit switch 85 are forced together by the salt, and terminals 91, 92 come into contact. This closes the low voltage indicator circuit, lighting indicator light 56 at control panel 53, which is adjacent to handle 33. Upon observing the indicator light 56, the operator pulls handle 33 to close the hopper gate valve 30 which stops the delivery of salt to bin 72. Although the gate valve is closed air under pressure continues to pan through it, and engine 36 is permitted to run until all of the salt in hose 31 is fully discharged. In this regard, the placement of level limit switch 85 in bin 72 is at a predetermined depth permitting the hose 31 to be emptied without overfilling the sale bin 72. Engine 36 is then stopped by turning switch 55 to the off position. The operator then returns to disconnect the electrical connectors 61, 62 from connectors 83, 84 and to remove delivery hose coupling 63 from the external house coupling 65. Delivery hose 31 is recoiled into the bed of pick-up truck 12, and the operator then drives to the next delivery location.

It will be observed that the entire salt delivery process is accomplished quickly, and without the operator having to enter the residence. The operator need only move between the pick-up truck and external house coupling, and does not have to unload and carry several heavy salt bags from the delivery truck into the residence, or to open the several bags, and lift and empty them into the salt bin. The inventive apparatus and system also makes use of less expensive salt in bulk form, eliminating the need for more expensive bags of salt as well as the difficulty of loading, transporting, unloading, carrying and emptying salt bags.

What is claimed is:

1. A method of remotely filling a salt bin of a water softener disposed within a residence or other structure having an external wall, a coupling member disposed externally of said wall and a conduit between said coupling member and a salt bin, the method comprising:
 transporting a vehicle having a sealed hopper containing salt to a point proximate said residence or other structure;
 connecting the end coupling of a salt delivery hose leading from the outlet of the salt hopper to the coupling member at said external wall;
 pressurizing the salt hopper;
 opening a gate valve disposed at the hopper outlet to cause salt to enter the delivery hose under pressure;
 closing the gate valve when the salt level in the salt bin has reached a predetermined level; and
 detaching the end coupling of the salt delivery hose from said external coupling member.

2. The method defined by claim 1, which further comprises generating a signal indicating when the level of salt in said salt bin reaches said predetermined level, and closing the gate valve in response to said signal.

3. The method defined by claim 2, which further comprises connecting electrical leads respectively disposed at the hose end coupling and the external coupling member, which leads respectively lead to a voltage source and signal annunciator at said transportable vehicle and a signal generating level indicator switch at said salt bin, prior to the delivery of salt, and disconnecting said leads when the hose end coupling and the external coupling member are disconnected.

4. The method defined by claim 1, wherein the salt hopper is connected to the outlet of a motor driven air pump disposed on said transportable vehicle, and comprises operating the motor driven air pump prior to opening the gate valve and stopping the motor driven air pump when the salt delivery is completed.

5. The method defined by claim 1, wherein said salt hopper is maintained at a pressure of about three psi.

* * * * *